US012644868B2

(12) United States Patent
Noda

(10) Patent No.: US 12,644,868 B2
(45) Date of Patent: Jun. 2, 2026

(54) PEAK TRACKING DEVICE AND PEAK TRACKING METHOD

(71) Applicant: Shimadzu Corporation, Kyoto (JP)

(72) Inventor: Akira Noda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 444 days.

(21) Appl. No.: 17/927,964

(22) PCT Filed: Mar. 31, 2021

(86) PCT No.: PCT/JP2021/014052
§ 371 (c)(1),
(2) Date: Nov. 28, 2022

(87) PCT Pub. No.: WO2021/240993
PCT Pub. Date: Dec. 2, 2021

(65) Prior Publication Data
US 2023/0204548 A1 Jun. 29, 2023

(30) Foreign Application Priority Data

May 28, 2020 (JP) .............................. JP2020-093335

(51) Int. Cl.
*G06F 11/30* (2006.01)
*G01N 30/86* (2006.01)
(52) U.S. Cl.
CPC .................................. *G01N 30/8634* (2013.01)
(58) Field of Classification Search
CPC .................................................... G01N 30/8634
See application file for complete search history.

(56) References Cited

U.S. PATENT DOCUMENTS

| | | |
|---|---|---|
| 2019/0011408 A1 | 1/2019 | Noda |
| 2021/0048417 A1 | 2/2021 | Yamashita |
| 2022/0196615 A1 | 6/2022 | Yamada et al. |

FOREIGN PATENT DOCUMENTS

| | | | |
|---|---|---|---|
| CN | 106970228 A | * | 7/2017 |
| JP | 06-324029 A | | 11/1994 |
| WO | 2017/119086 A1 | | 7/2017 |
| WO | 2019/176658 A1 | | 9/2019 |

(Continued)

OTHER PUBLICATIONS

Kawabe et al., "Ternary isocratic mobile phase optimization utilizing resolution Design Space based on retention time and peak width modeling," Journal of Chromatography A, vol. 1273 95P to 104P, Jan. 18, 2013 (Year: 2013).*

(Continued)

*Primary Examiner* — Phuong Huynh
(74) *Attorney, Agent, or Firm* — Muir Patent Law, PLLC

(57) ABSTRACT

A peak tracking device includes a chromatogram acquirer that acquires chromatograms based on measurement data pieces obtained from measurements by an analyzer in accordance with analysis condition data pieces, a score calculator that calculates score data based on a belonging probability, the probability being calculated for each peak appeared in each chromatogram to belong to one of substances included in a sample, and a score displayer that displays on a display the score data calculated by the score calculator.

5 Claims, 12 Drawing Sheets

(56) References Cited

FOREIGN PATENT DOCUMENTS

| WO | WO 2019176658 | * | 9/2019 |
| WO | 2020/225864 A1 | | 11/2020 |

OTHER PUBLICATIONS

International Search Report with respect to International Patent Application No. PCT/JP2021/014052, dated Jun. 22, 2021.
Kawabe et al., "Ternary isocratic mobile phase optimization utilizing resolution Design Space based on retention time and peak width modeling" Journal of Chromatography A, vol. 1273, pp. 95-104, Jan. 18, 2013.
Written Opinion of the International Searching Authority with respect to International Patent Application No. PCT/JP2021/014052, dated Jun. 22, 2021.
Notice of Reasons for Refusal dated Feb. 27, 2024 in counterpart Japanese patent application No. JP 2022-527541.
Office Action dated Sep. 26, 2024, in the counterpart Chinese patent application No. CN 202180037872.3.
Notice of Reasons for Refusal dated Nov. 27, 2024, in the counterpart Japanese patent application (2022-527541) and English machine translation thereof.

* cited by examiner

F I G. 1
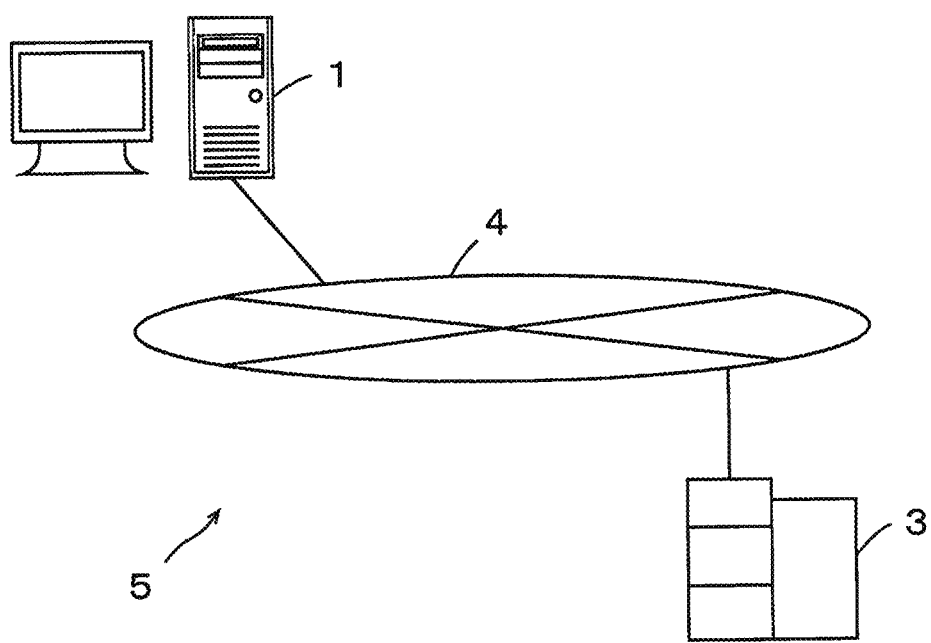

F I G. 2
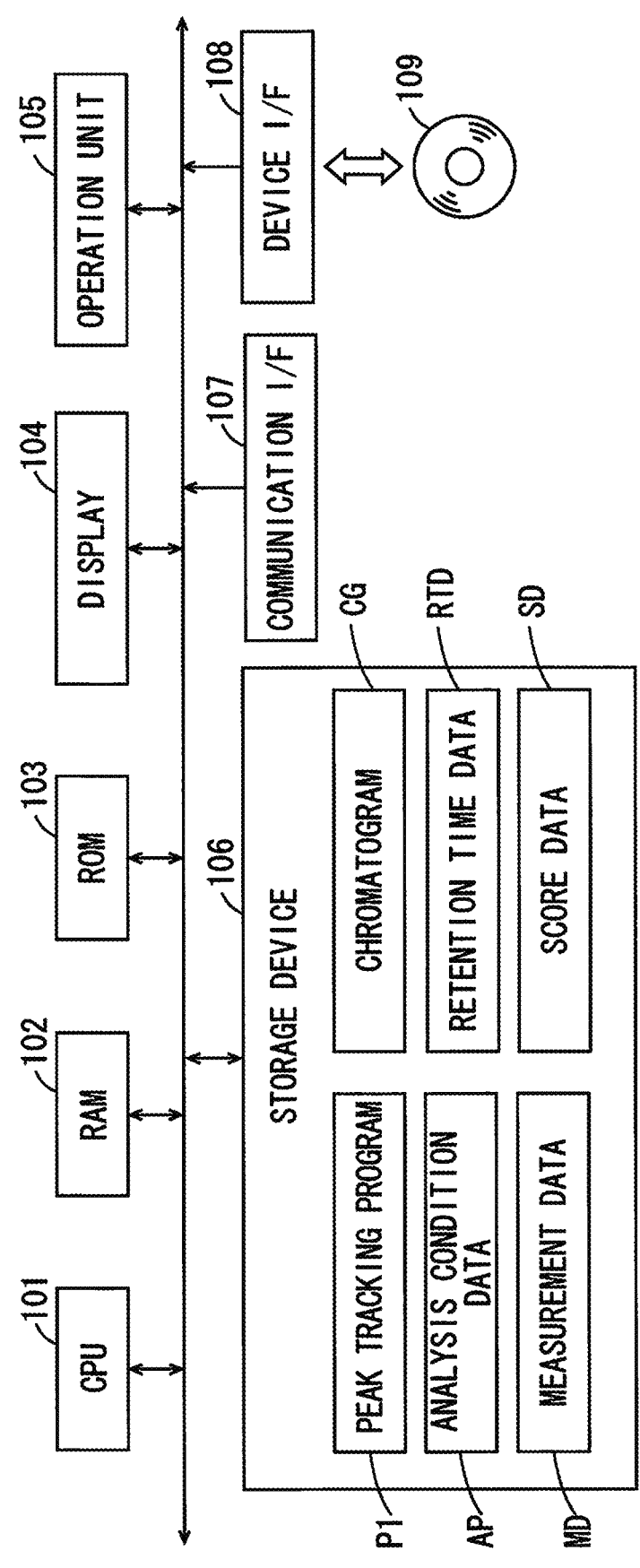

F I G. 3
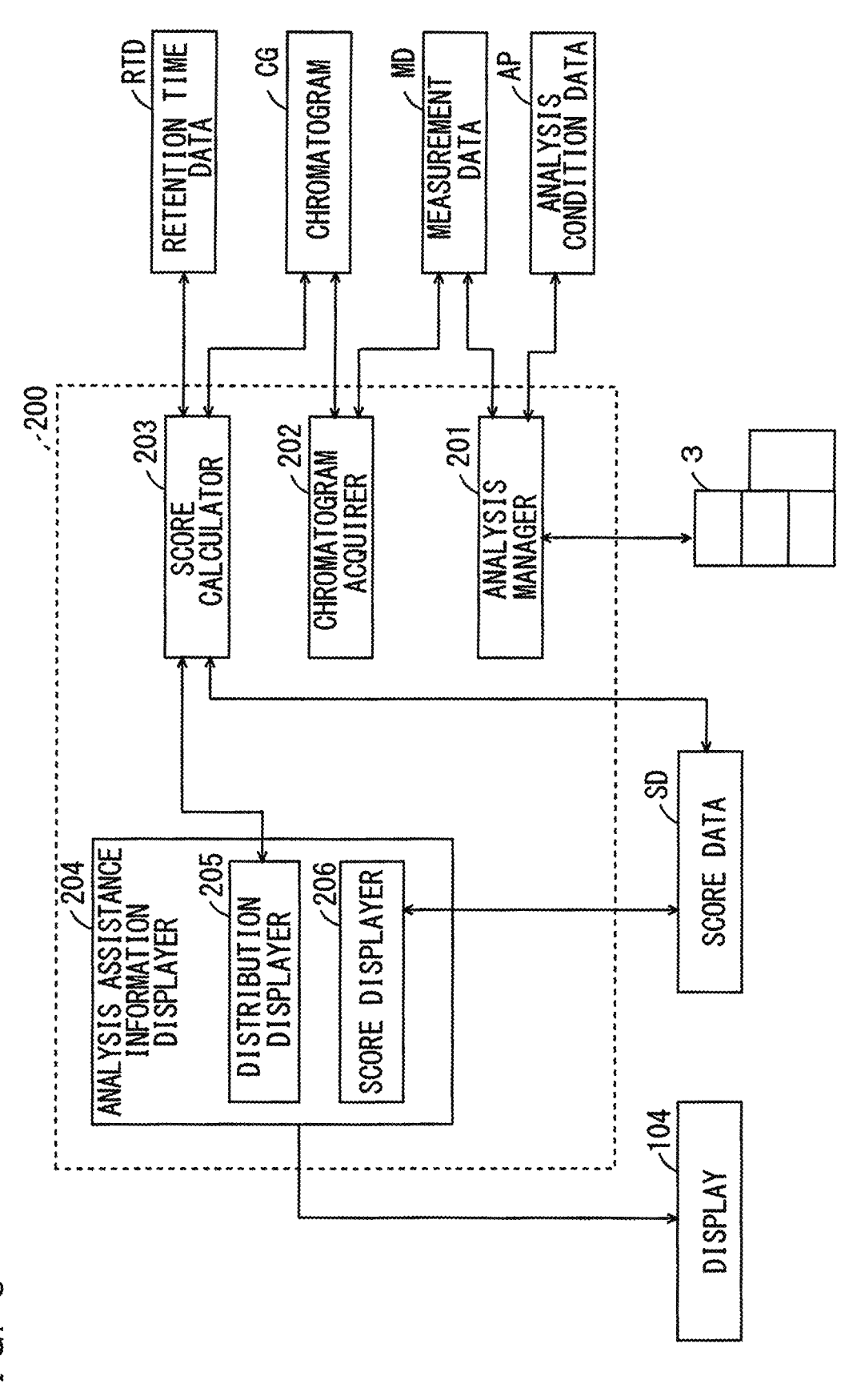

F I G. 4
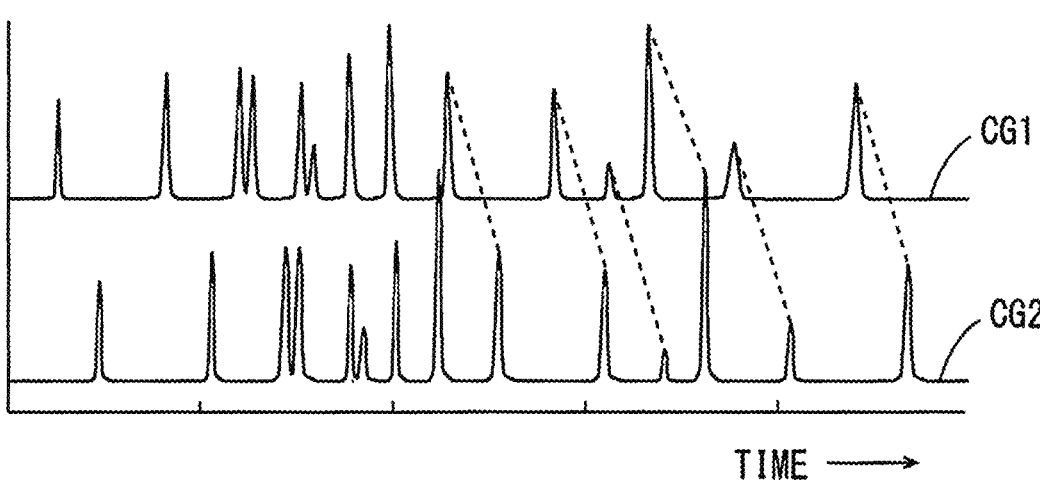
CG1
CG2
TIME ⟶

FIG. 5

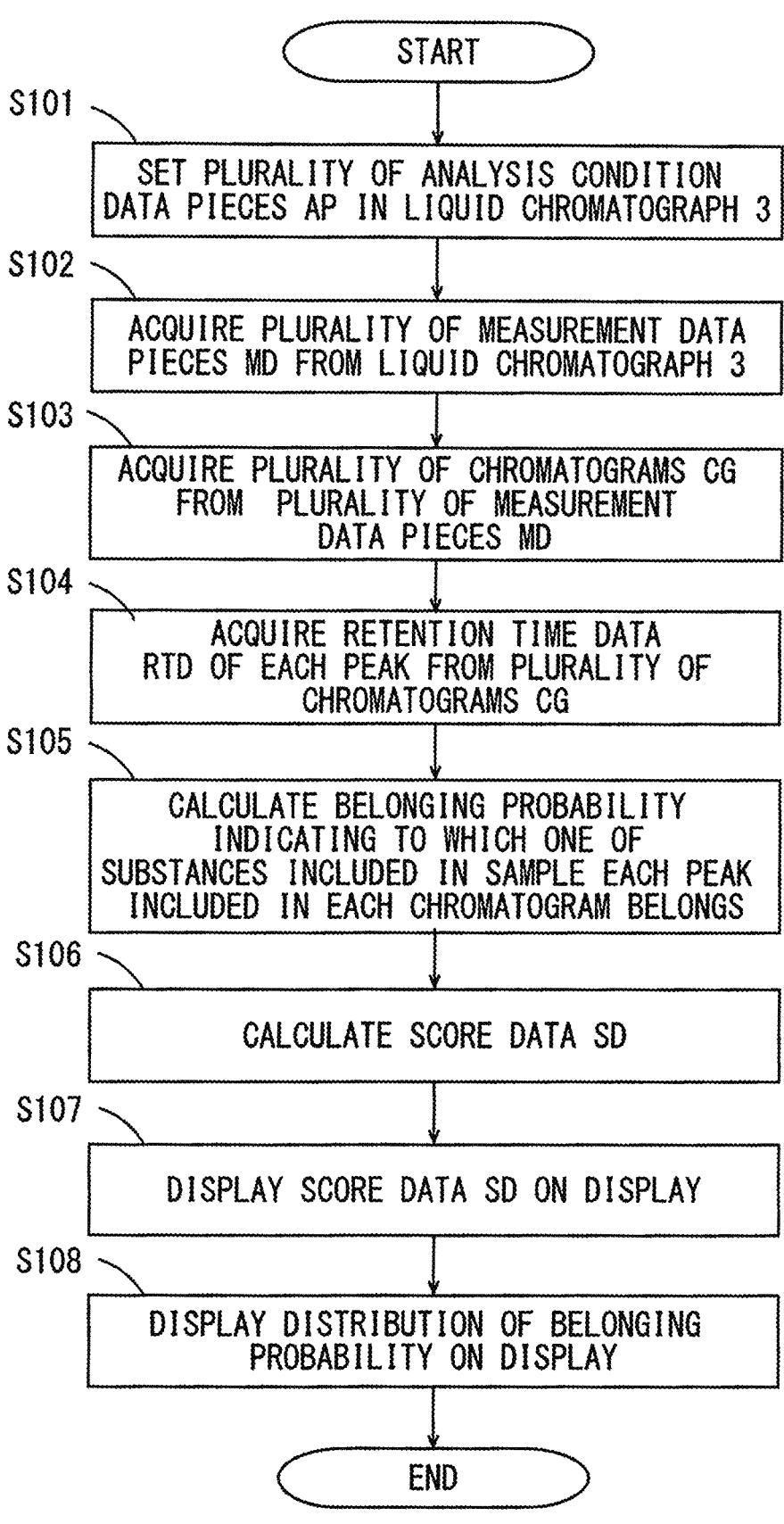

START

S101

SET PLURALITY OF ANALYSIS CONDITION DATA PIECES AP IN LIQUID CHROMATOGRAPH 3

S102

ACQUIRE PLURALITY OF MEASUREMENT DATA PIECES MD FROM LIQUID CHROMATOGRAPH 3

S103

ACQUIRE PLURALITY OF CHROMATOGRAMS CG FROM PLURALITY OF MEASUREMENT DATA PIECES MD

S104

ACQUIRE RETENTION TIME DATA RTD OF EACH PEAK FROM PLURALITY OF CHROMATOGRAMS CG

S105

CALCULATE BELONGING PROBABILITY INDICATING TO WHICH ONE OF SUBSTANCES INCLUDED IN SAMPLE EACH PEAK INCLUDED IN EACH CHROMATOGRAM BELONGS

S106

CALCULATE SCORE DATA SD

S107

DISPLAY SCORE DATA SD ON DISPLAY

S108

DISPLAY DISTRIBUTION OF BELONGING PROBABILITY ON DISPLAY

END

F I G.  6
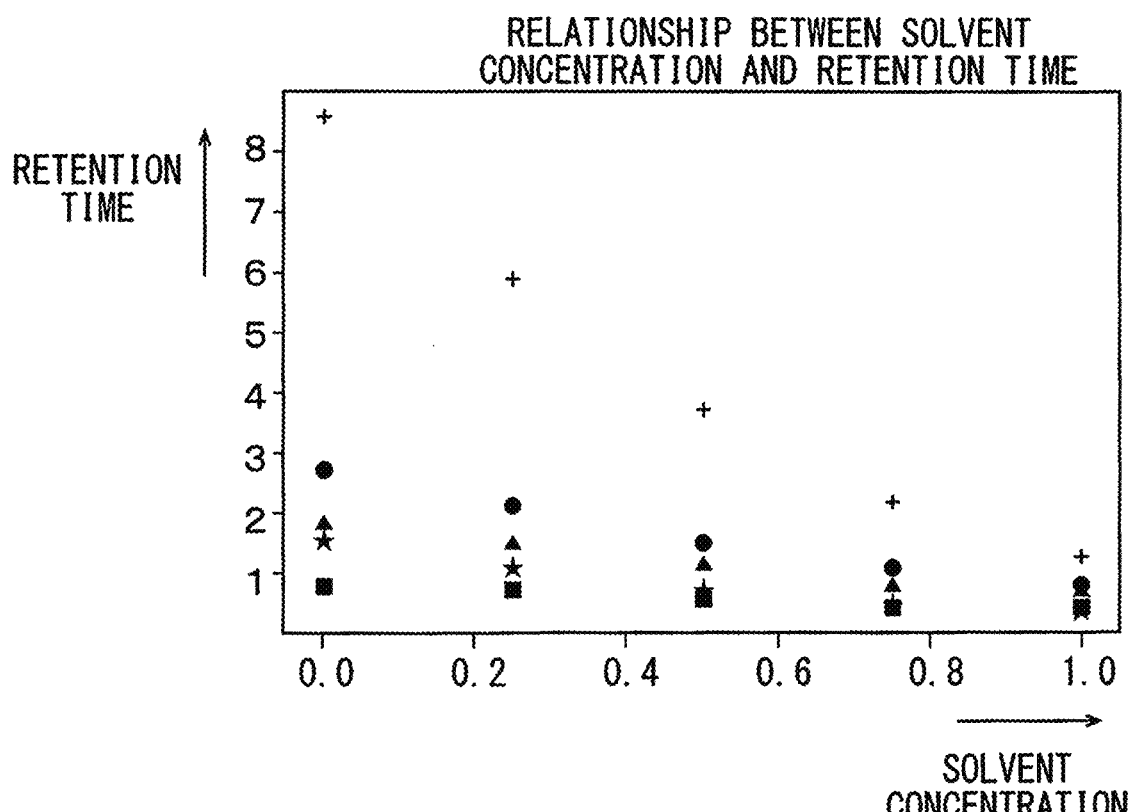

F I G. 7
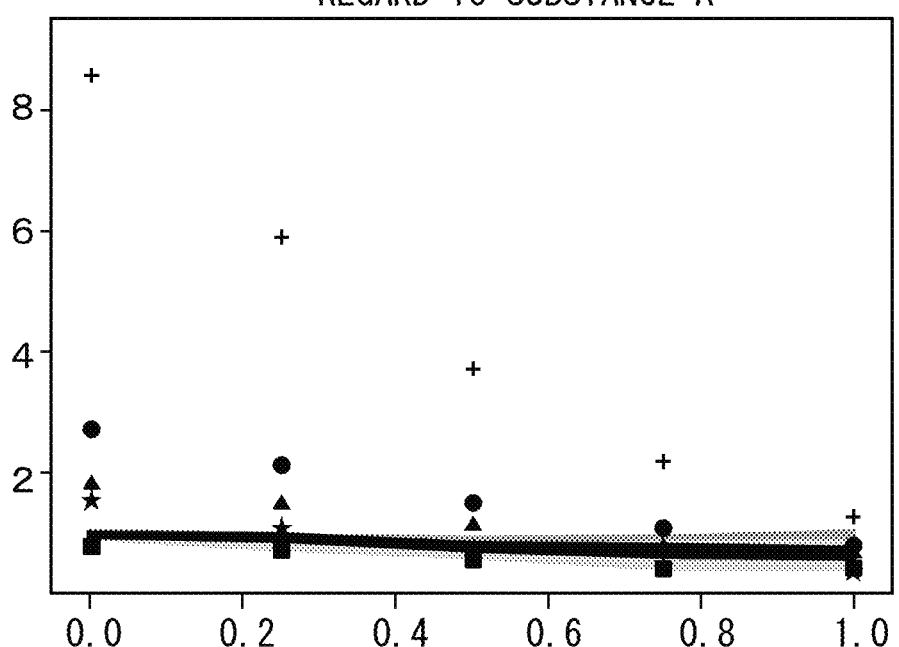
F I G. 8
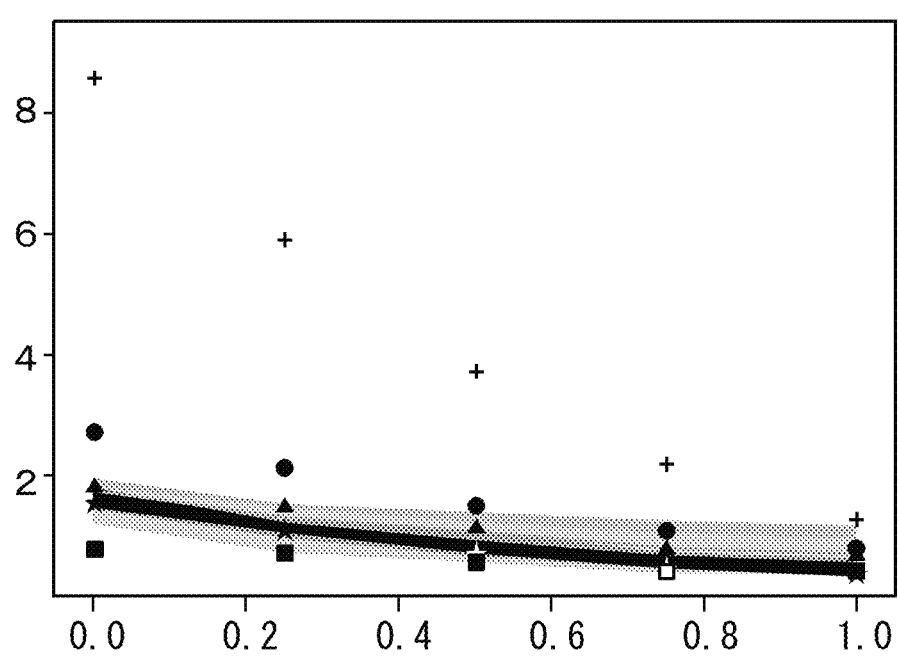

F I G.  9
PREDICTIVE DISTRIBUTION IN
REGARD TO SUBSTANCE C
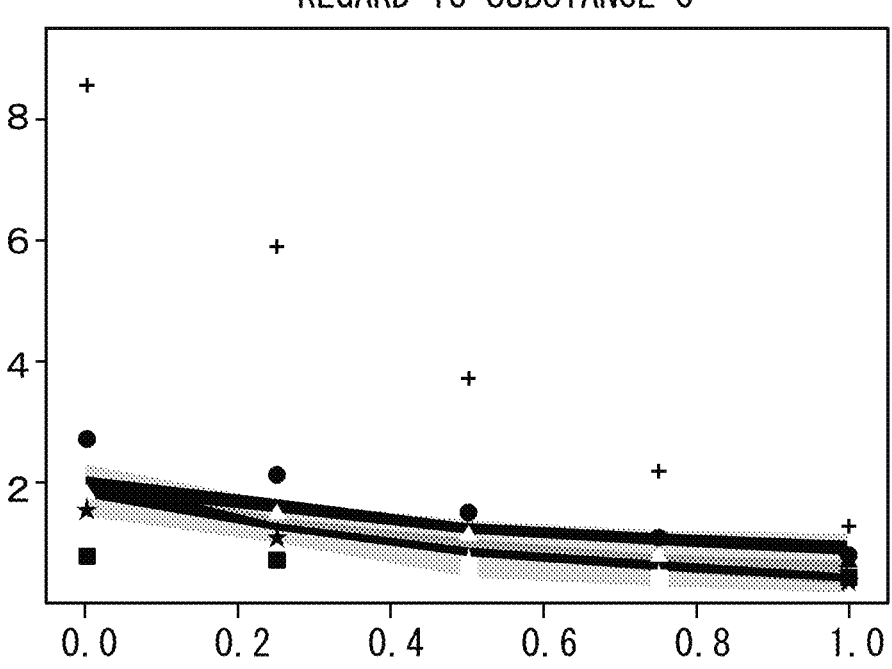
F I G.  1 0
PREDICTIVE DISTRIBUTION IN
REGARD TO SUBSTANCE D
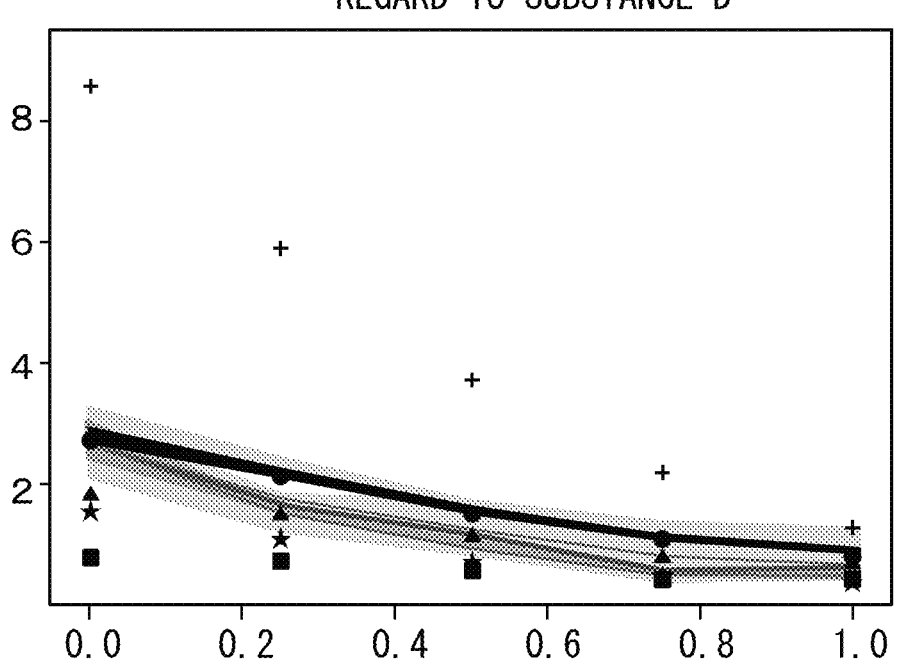

F I G.  1 1
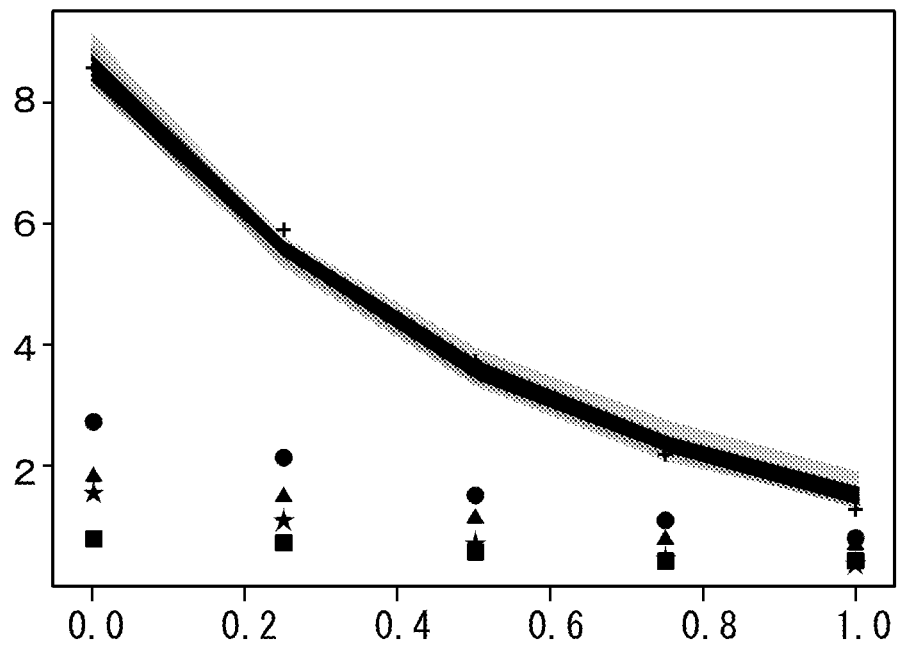
PREDICTIVE DISTRIBUTION IN
REGARD TO SUBSTANCE E

F I G.  1 2
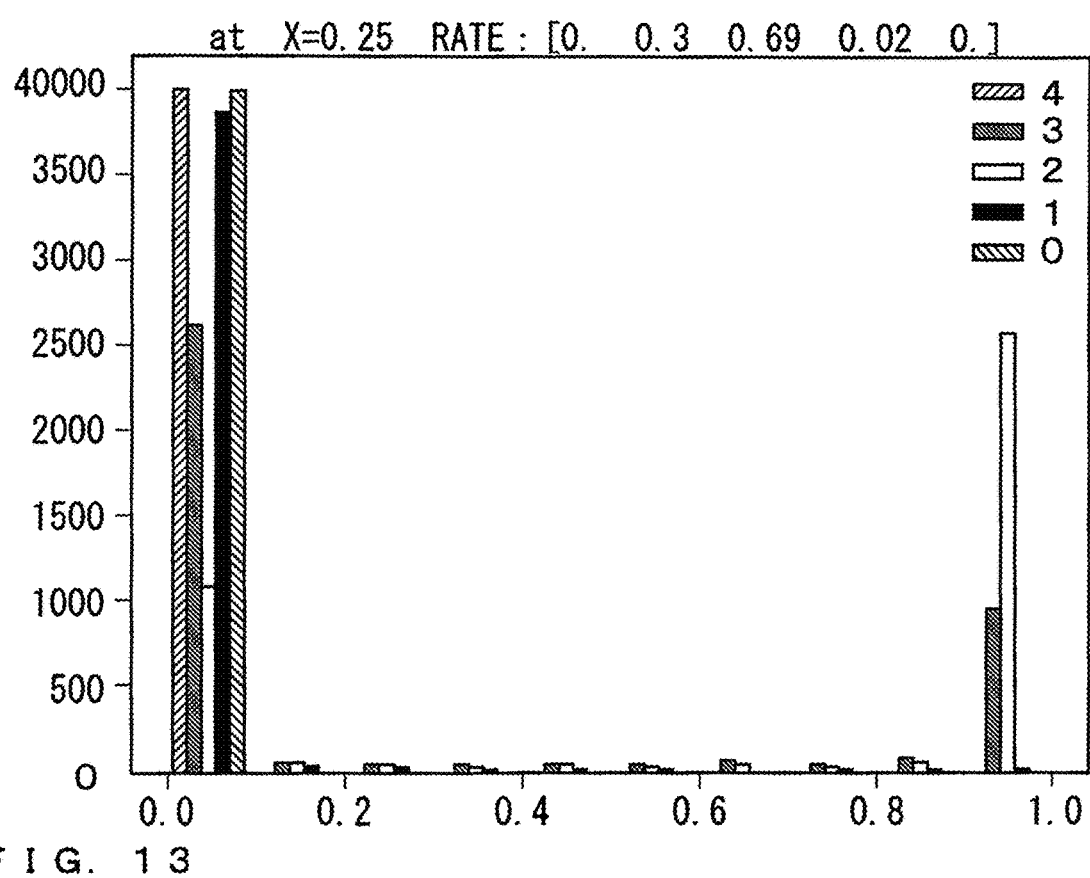
F I G.  1 3
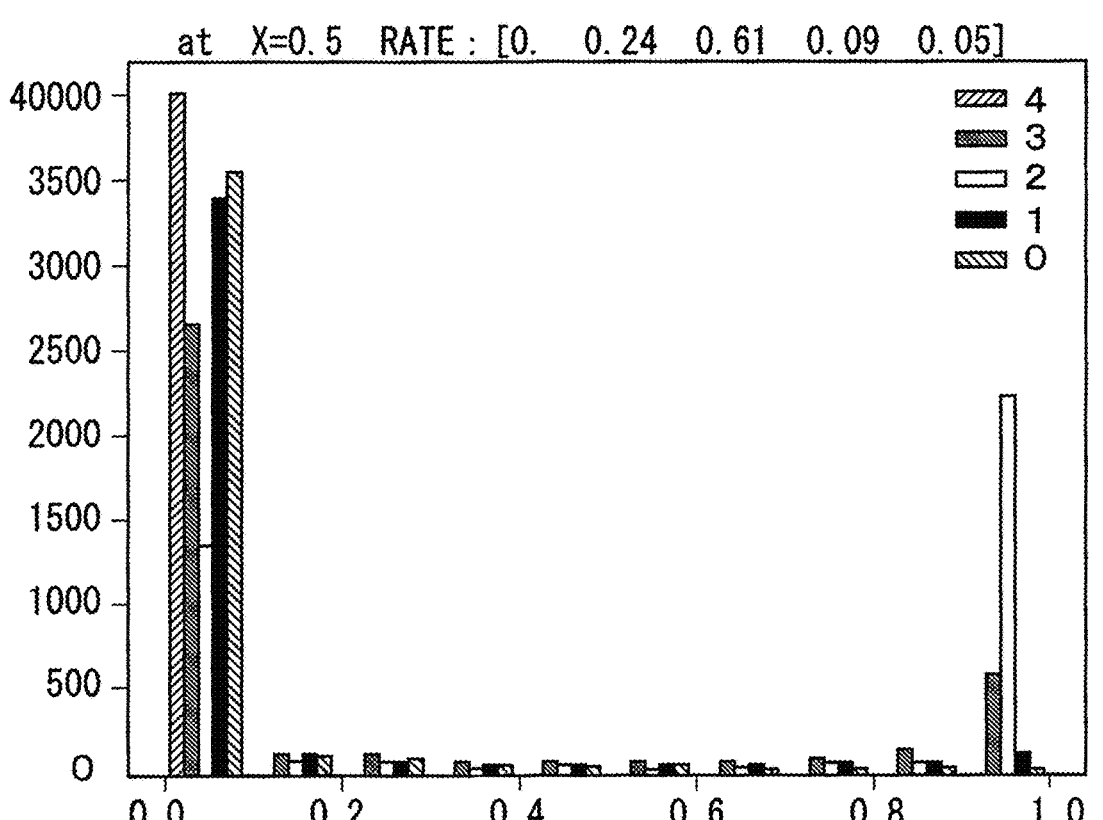

F I G. 1 4
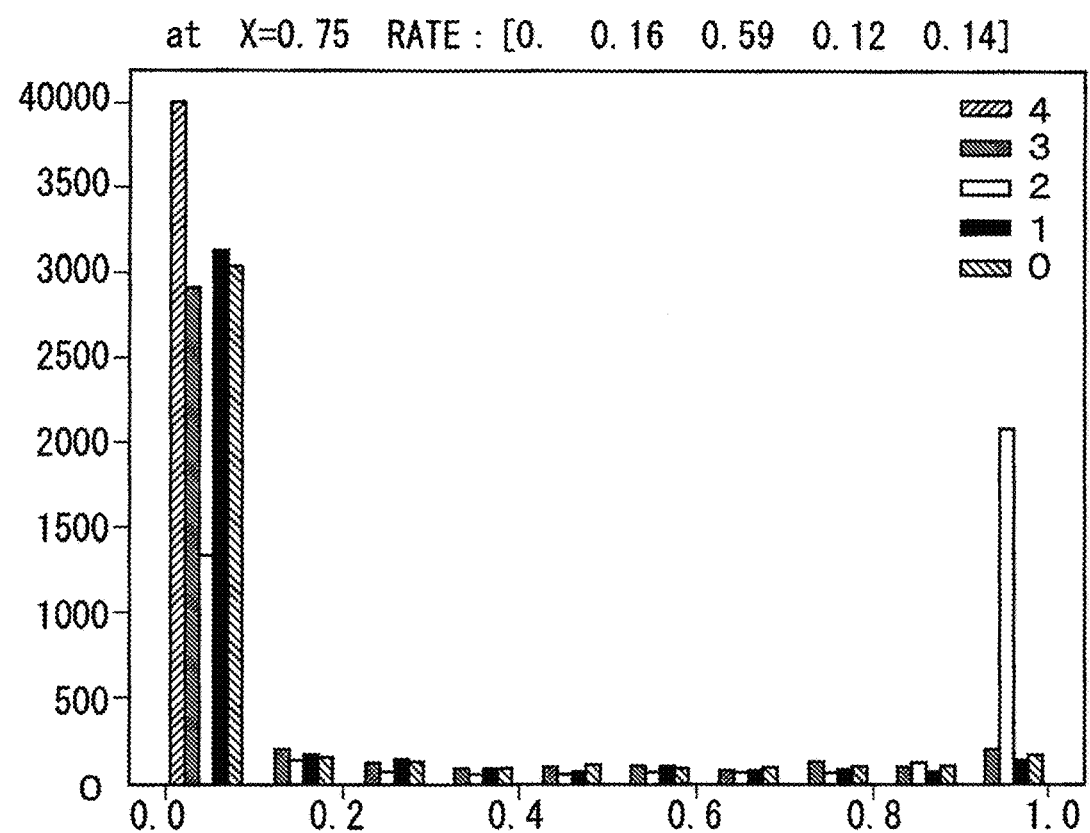
F I G. 1 5
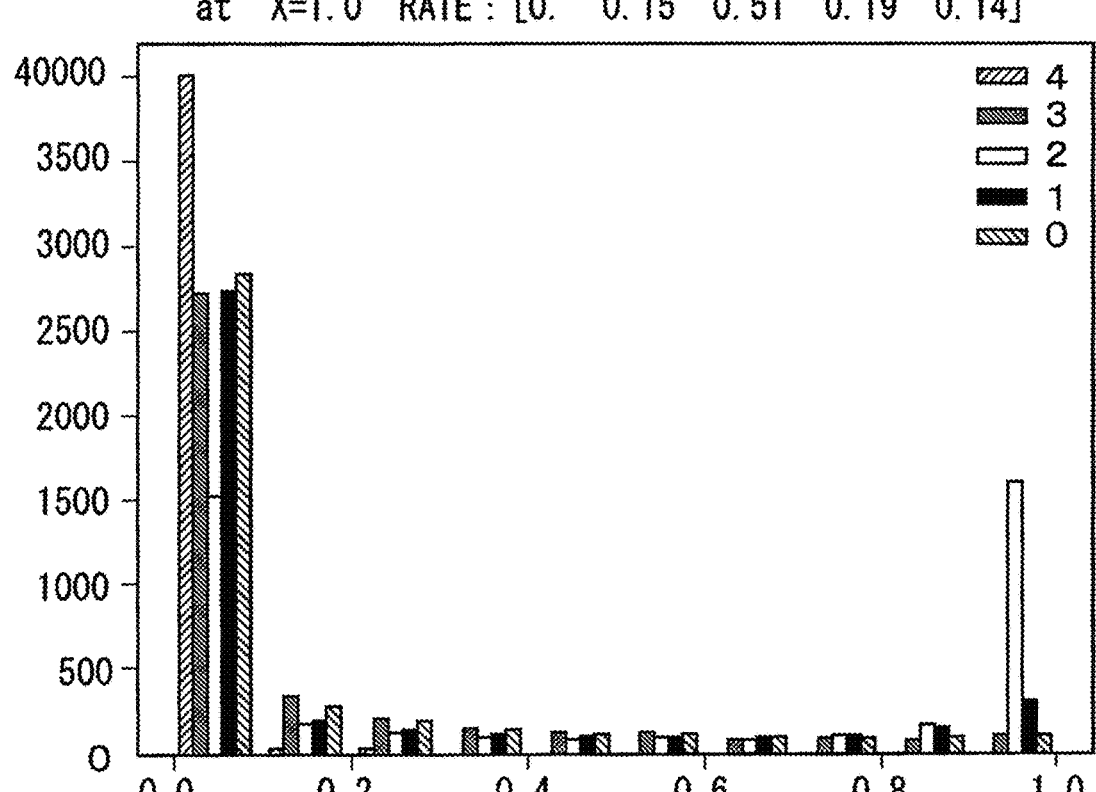

F I G. 1 6
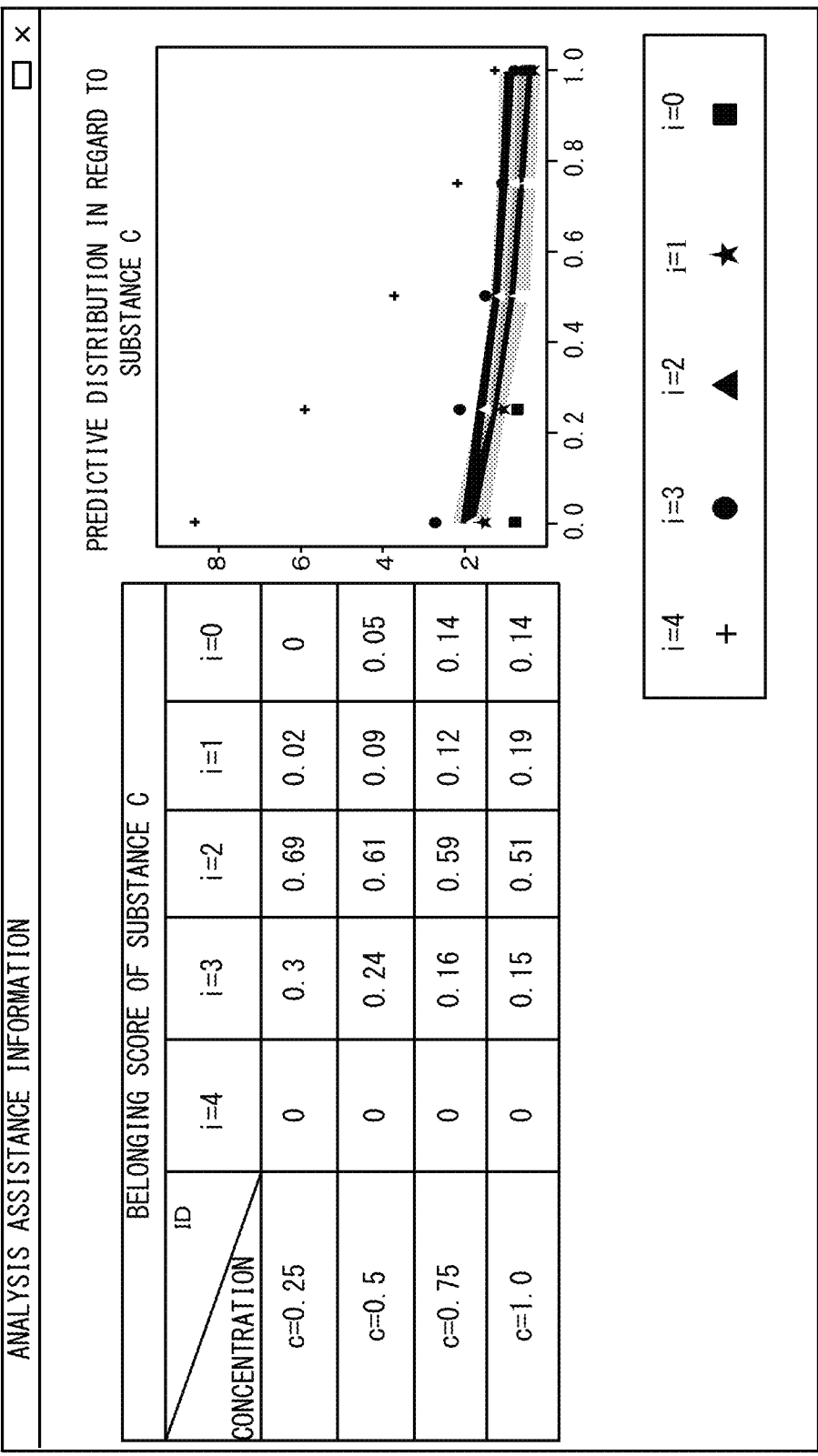

PEAK TRACKING DEVICE AND PEAK TRACKING METHOD

TECHNICAL FIELD

The present invention relates to a peak tracking device and a peak tracking method.

BACKGROUND ART

A chromatogram of a sample can be acquired from a measurement data piece acquired in an analysis device. Method scouting for optimizing analysis condition data is performed for the purpose of increasing a peak resolution or the purpose of shortening an analysis period of time.

When method scouting is performed, it is necessary to perform peak tracking for determining peaks derived from the same substance among different chromatograms obtained based on different analysis condition data pieces. In order to perform peak tracking, an area value of a peak, an optical spectrum of a peak or the similarity of an MS spectrum of a peak is used, for example.

Further, it is possible to provide information useful for method scouting by performing a regression analysis of an analysis condition data piece and an analysis measurement data piece. In the below-mentioned Non-Patent Document 1, a regression analysis of a retention time is performed.

[Non-Patent Document 1] "Ternary isocratic mobile phase optimization utilizing resolution Design Space based on retention time and peak width modeling," Journal of Chromatography A, Volume 1273 95P to 104P, Jan. 18, 2013.

SUMMARY OF INVENTION

Technical Problem

It has been known that analogies having similar structures are produced as by-products in the synthesis of drugs having relatively large molecular weights such as nucleic acid drugs and peptide drugs. Since such analogies also have similar optical spectra, peak tracking might not be sufficiently performed even with use of optical spectrum similarities. Further, MS spectra of such analogies often have similar shapes, and an enormous amount of labor is required to search for an m/z value at which a unique chromatogram is output for each peak. Even with a method with use of a peak area value, a combination is often not specified, and peak tracking might not be performed sufficiently.

An object of the present invention is to provide information that is useful for identifying peaks included in a chromatogram to a user.

Solution to Problem

A peak tracking device according to one aspect of the present invention includes a peak tracking device including a chromatogram acquirer that acquires chromatograms based on measurement data pieces obtained from measurements by an analyzer in accordance with analysis condition data pieces, a score calculator that calculates score data based on a belonging probability, the probability being calculated for each peak appeared in each chromatogram to belong to one of substances included in a sample, and a score displayer that displays on a display the score data calculated by the score calculator.

Advantageous Effects of Invention

With the present invention, it is possible to provide information that is useful for identifying peaks included in a chromatogram to a user.

BRIEF DESCRIPTION OF THE DRAWINGS

FIG. 1 is the overview of an analysis system according to the present embodiment.

FIG. 2 is a diagram showing the configuration of a computer according to the present embodiment.

FIG. 3 is a block diagram showing the functions of the computer according to the present embodiment.

FIG. 4 is a diagram showing chromatograms obtained from different analysis condition data pieces.

FIG. 5 is a flowchart showing a peal tracking method according to the present embodiment.

FIG. 6 is a diagram showing the relationship between a solvent concentration and a retention time.

FIG. 7 is a diagram showing the predictive distribution of the retention-time regression curve of a substance A.

FIG. 8 is a diagram showing the predictive distribution of the retention-time regression curve of a substance B.

FIG. 9 is a diagram showing the predictive distribution of the retention-time regression curve of a substance C.

FIG. 10 is a diagram showing the predictive distribution of the retention-time regression curve of a substance D.

FIG. 11 is a diagram showing the predictive distribution of the retention-time regression curve of a substance E.

FIG. 12 is a diagram showing the histogram of the categorical distribution probability at the solvent concentration of "0.25."

FIG. 13 is a diagram showing the histogram of the categorical distribution probability at the solvent concentration of "0.5."

FIG. 14 is a diagram showing the histogram of the categorical distribution probability at the solvent concentration of "0.75."

FIG. 15 is a diagram showing the histogram of the categorical distribution probability at the solvent concentration of "1.0."

FIG. 16 is a diagram showing an analysis assistance screen displayed on a display.

DESCRIPTION OF EMBODIMENTS

The configurations of a peak tracking device, a peak tracking method and a peak tracking program according to embodiments of the present invention will now be described with reference to the attached drawings.

(1) OVERALL CONFIGURATION OF ANALYSIS SYSTEM

FIG. 1 is an overview of an analysis system 5 according to the present embodiment. The analysis system 5 includes a computer 1 and a liquid chromatograph 3. The computer 1 and the liquid chromatograph 3 are connected to each other through a network 4. The network 4 is a LAN (Local Area Network), for example.

The computer 1 has a function of setting an analysis condition in the liquid chromatograph 3, a function of acquiring a result of measurement in the liquid chromatograph 3 and analyzing the result of measurement and so on. A program for controlling the liquid chromatograph 3 is installed in the computer 1.

The liquid chromatograph 3 includes a pump unit, an autosampler unit, a column oven unit, a detector unit and so on. The liquid chromatograph 3 also includes a system controller. The system controller controls the liquid chromatograph 3 in accordance with a control instruction received from the computer 1 through the network 4. The system controller transmits the data of a result of measurement of the liquid chromatograph 3 to the computer 1 through the network 4.

(2) CONFIGURATION OF COMPUTER (PEAK TRACKING DEVICE)

FIG. 2 is a diagram showing the configuration of the computer 1. In the present embodiment, a personal computer is utilized as the computer 1. The computer 1 includes a CPU (Central Processing Unit) 101, a RAM (Random Access Memory) 102, a ROM (Read Only Memory) 103, a display 104, an operation unit 105, a storage device 106, a communication interface 107 and a device interface 108.

The CPU 101 controls the computer 1. The RAM 102 is used as a work area for execution of a program by the CPU 101. A control program and the like are stored in the ROM 103. The display 104 is a liquid crystal display, for example. The operation unit 105 is a device that receives a user operation, and includes a keyboard, a mouse and so on. The display 104 may be constituted by a touch panel display, and the display 104 may have a function of serving as the operation unit 105. The storage device 106 is a device that stores various programs and data. The storage device 106 is a hard disc, for example. The communication interface 107 is an interface that communicates with another computer and another device. The communication interface 107 is connected to the network 4. The device interface 108 is an interface for accessing various external devices. The CPU 101 can access a recording medium 109 through an external device connected to the device interface 108.

The storage device 106 stores the peak tracking program P1, analysis condition data AP, measurement data MD, a chromatogram CG, retention time data RTD and score data SD. The peak tracking program P1 is a program for controlling the liquid chromatograph 3. The peak tracking program P1 has a function of setting an analysis condition with respect to the liquid chromatograph 3 and a function of acquiring a result of measurement from the liquid chromatograph 3 and analyzing the result of measurement such as generating a chromatogram CG, etc. The analysis condition data AP is the data describing an analysis condition to be set in the liquid chromatograph 3 and includes a plurality of analysis parameters. The measurement data MD is the data of a result of measurement acquired from the liquid chromatograph 3. The retention time data RTD is the data representing a retention time of a substance included in the chromatogram CG. In the present embodiment, a plurality of substances are included in a sample to be analyzed, and peaks of the plurality of substances are included in the chromatogram CG. Thus, data representing a plurality of retention times for each chromatogram CG is included in the retention time data RTD. The score data SD is the data calculated based on a belonging probability indicating to which substance included in a sample each peak included in a chromatogram belongs.

FIG. 3 is a block diagram showing the functions of the computer 1. The controller 200 is a function implemented when the CPU 101 uses the RAM 102 as a work area and executes the peak tracking program P1. The controller 200 includes an analysis manager 201, a chromatogram acquirer 202, a score calculator 203 and an analysis assistance information displayer 204.

The analysis manager 201 controls the liquid chromatograph 3. The analysis manager 201 instructs the liquid chromatograph 3 to execute an analysis process in response to receiving an instruction for setting an analysis condition data piece AP and starting the analysis process from a user. The user sets combinations of setting values of analysis parameters such as a solvent concentration, a solvent mixing ratio, a gradient initial value, a gradient and a column temperature as analysis conditions. The user sets a plurality of combinations of these analysis parameters. For example, combinations of analysis parameters having solvent concentrations being slightly different from one another, combinations of analysis parameters having column temperatures being slightly different from one another, etc. are set as the analysis conditions. The user creates a plurality of analysis condition data pieces AP in this manner and executes the analysis process on the same sample based on the plurality of analysis condition data pieces AP.

The analysis manager 201 also acquires a measurement data piece MD from the liquid chromatograph 3. As described above, the user executes the analysis process based on the plurality of analysis condition data pieces AP. The analysis manager 201 acquires the plurality of measurement data pieces MD corresponding to the plurality of analysis condition data pieces AP.

The chromatogram acquirer 202 acquires a chromatogram CG based on a measurement data piece MD. The chromatogram acquirer 202 saves the acquired chromatogram CG in the storage device 106. As described above, the analysis manager 201 acquires the plurality of measurement data pieces MD corresponding to the plurality of analysis condition data pieces AP. The chromatogram acquirer 202 acquires the plurality of chromatograms CG corresponding to the plurality of measurement data pieces MD.

The score calculator 203 calculates score data SD based on the plurality of chromatograms CG acquired by the chromatogram acquirer 202. A sample analyzed in the liquid chromatograph 3 in the present embodiment includes a plurality of substances. The score calculator 203 calculates a belonging probability indicating to which substance included in a sample each peak included in a chromatogram CG belongs.

FIG. 4 is a diagram showing two chromatograms CG1, CG2 obtained based on two different analysis condition data pieces AP. The chromatograms CG1, CG2 are acquired based on measurement data pieces MD obtained in regard to the same sample. As can be seen from FIG. 4, the retention time of each peak in the chromatogram CG1 is different from the retention time of each peak in the chromatogram CG2 due to differences between the analysis condition data pieces AP. Peaks connected by the dotted lines are the peaks derived from the same substance. The score calculator 203 calculates a belonging probability indicating to which substance included in the sample each peak included in the chromatograms CG1, CG2 belongs.

Specifically, the score calculator 203 performs a regression analysis using a solvent concentration which is an analysis parameter included in an analysis condition data piece AP and retention time data RTD of each peak obtained from a chromatogram CG. In the present embodiment, the score calculator 203 performs regression of retention time data RTD using Bayesian inference. Then, the score calculator 203 calculates a belonging probability indicating to which substance included in a sample each peak included in a chromatogram CG belongs based on a result of regression analysis of the retention time data RTD. Then, the score calculator 203 generates score data SD based on the calculated belonging probability.

The analysis assistance information displayer 204 displays information for analysis assistance on the display 104. The analysis assistance information displayer 204 includes a distribution displayer 205 and a score displayer 206. The distribution displayer 205 displays the result of regression analysis in the score calculator 203 on the display 104. The score displayer 206 displays the score data SD calculated by the score calculator 203 on the display 104.

(3) PEAK TRACKING METHOD

Next, a peak tracking method to be executed in the computer 1 (peak tracking device) according to the present embodiment will be described. FIG. 5 is a flowchart showing the peak tracking method according to the present embodiment. It has been known that the retention time of each substance in a chromatograph can be regressed with respect to an analysis parameter such as a solvent concentration, a pH, a column temperature, etc. With the peak tracking method of the present embodiment, belonging of each peak included in a chromatogram is determined at the same time as regression of a retention time. In a case in which a belonging problem is solved at the same time as regression, the solution is not always unique. Therefore, in the present embodiment, a possible distribution is acquired as a solution by posterior distribution calculation with use of Bayesian inference.

Before the process shown in FIG. 5 is started, the user operates the operation unit 105 to set a plurality of analysis conditions in advance. In response to receiving such a user setting operation, the analysis manager 201 saves a plurality of analysis condition data pieces AP in the storage device 106.

Next, in the step S101 shown in FIG. 5, the analysis manager 201 sets the plurality of analysis condition data pieces AP in the liquid chromatograph 3. Specifically, the analysis manager 201 sets the plurality of analysis condition data pieces AP in the system controller of the liquid chromatograph 3. In response to this, in the liquid chromatograph 3, an analysis process is executed multiple times on the same sample based on the plurality of set analysis condition data pieces AP. In the liquid chromatograph 3, a plurality of measurement data pieces MD are acquired in correspondence with the plurality of analysis condition data pieces AP.

Next, in the step S102, the analysis manager 201 acquires the plurality of measurement data pieces MD from the liquid chromatograph 3. The analysis manager 201 saves the plurality of acquired measurement data pieces MD in the storage device 106.

Next, in the step S103, the chromatogram acquirer 202 acquires the plurality of measurement data pieces MD saved in the storage device 106 in the step S102, and acquires a plurality of chromatograms CG from the plurality of acquired measurement data pieces MD.

Next, in the step S104, the score calculator 203 acquires the plurality of chromatograms CG acquired in the step S103 and acquires retention time data RTD of each peak included in each chromatogram CG.

FIG. 6 is a diagram showing the relationship between an analysis condition data piece AP and the retention time data RTD acquired in the step S104. In FIG. 6, the abscissa indicates a solvent concentration among analysis parameters included in the analysis condition data pieces AP. In FIG. 6, the ordinate indicates a retention time. In FIG. 6, retention times acquired in regard to five solvent concentrations are plotted in correspondence with the five analysis condition data pieces AP. Although there are five types of solvent concentrations which are "0.0," "0.25," "0.5," "0.75" and "1.0," the unit of the solvent concentrations is not particularly meaningful.

Five retention times are plotted for each of the five solvent concentrations. These five retention times are the retention times of five peaks of substances A to E included in the sample. In FIG. 6, the points for 5 retention times are indicated by five types of symbols. Specifically, the five types of symbols which are a square, a star, a triangle, a circle and a cross are used in an ascending order of the retention times. However, since the order of the retention times may be switched in practice depending on a solvent concentration, the symbols in FIG. 6 are used for the sake of convenience. That is, the same type of symbols does not necessarily indicate the retention times of peaks derived from the same substance. Here, the five retention times at the concentration of "0.0" are associated with the substances A to E in the ascending order of the retention times. That is, at the concentration of "0.0," the square indicates the substance A, the star indicates the substance B, the triangle indicates the substance C, the circle indicates the substance D and the cross indicates the substance E. The main object of the present invention is to present a belonging probability indicating to which one of the substances A to DE a peak corresponding to the retention time indicated by one of the five symbols at one of the concentrations of "0.25," "0.5," "0.75" and "1.0" belongs.

Next, in the step S105, the score calculator 203 obtains a belonging probability (posterior distribution) indicating to which substance each peak belongs by using the following formula (1).

[Formula 1]

$$\Pi_c \Pi_i p(i|c) N(x_{ci}|f(c), \sigma) \tag{1}$$

In the formula (1), c is a concentration. In the example shown in FIG. 6, the concentration c has five types which are "0.0," "0.25," "0.5," "0.75" and "1.0." In the formula (1), i is an ID of a peak. In the example shown in FIGS. 6, i=0 to 4 are assigned as IDs in the ascending order of the retention times. That is, in FIG. 6, in regard to the IDs, i=0 is assigned to the peaks indicated by the squares, i=1 is assigned to the peaks indicated by the stars, i=2 is assigned to the peaks indicated by the triangles, i=3 is assigned to the peaks indicated by the circles and i=4 is assigned to the peaks indicated by the crosses.

p(i|c) indicates the probability that a peak is to be selected based on a categorical distribution. p(i|c) is the probability that a peak for i=0 to 4 is to be selected at the concentration c. That is, p(i|c) is a prior distribution for calculating a posterior distribution indicating to which one of the substances A to E each peak belongs. In the present embodiment, p(i|c) is constant regardless of i in order to facilitate explanation. However, it is possible to set an appropriate value as the probability that a peak is to be selected at the concentration c by referring to a spectrum or area of the peak. For example, it is possible to set an appropriate value for p(i|c) by referring to the magnitude relationship of peaks of the substances A to E, the similarities of spectra or the like.

In the formula (1), x is a retention time at the concentration c and when ID=i. In the formula (1), f(c) is a regression function of the retention time with respect to the concentration c. N (u, σ) represents the probability of x under the conditions of an average u and a standard deviation σ. That is, in the formula (1), the function N represents the likelihood of x.

The score calculator 203 provides an appropriate prior distribution to an assumed noise amount (standard deviation σ) or a regression coefficient in the regression function f(c) to perform Bayesian estimation. An approximate value is appropriately provided to a noise amount (standard deviation σ) based on the accuracy of a repetitive process of the liquid chromatograph 3. Further, because it has been known that a second-order coefficient is extremely small for most substances in a case in which the regression function f(c) is a logarithm of a quadratic polynomial, an appropriate normal distribution can be empirically set. Alternatively, it is possible to set an appropriate value by using an information criterion such as WAIC based on a past instance where peak tracking has already been completed. In regard to a first-order coefficient, a general trend has been known for a changes in solvent concentration. In regard to all of the substances A to E, the example of FIG. 6 also shows that the retention time generally decreases as the solvent concentration increases. Therefore, more preferably, a gentle prior distribution such as a t-distribution can be empirically provided. As described above, the posterior distribution in regard to each peak belonging to the substances A to E can be obtained based on a likelihood and a prior distribution. In the present embodiment, Bayesian inference based on NUTS sampling is used. Thus, a likelihood is calculated in regard to i (ID) by marginalization. The use of NUTS sampling is an example, and other Bayesian approaches can be used.

FIGS. 7 to 11 are diagrams showing predictive distributions (distributions of belonging probabilities) calculated with use of Bayesian inference in regard to the retention times shown in FIG. 6. FIG. 7 is the predictive distribution in regard to the substance A. That is, FIG. 7 is the diagram showing the predictive distribution based on Bayesian inference in regard to the substance A indicated by the square at the concentration of "0.0." FIG. 8 is the predictive distribution in regard to the substance B. That is, FIG. 8 is the diagram showing the predictive distribution based on Bayesian inference in regard to the substance B indicated by the star at the concentration of "0.0." FIG. 9 is the predictive distribution in regard to the substance C. That is, FIG. 9 is the diagram showing the predictive distribution based on Bayesian inference in regard to the substance C indicated by the triangle at the concentration of "0.0." FIG. 10 is the predictive distribution in regard to the substance D. That is, FIG. 10 is the diagram showing the predictive distribution based on Bayesian inference in regard to the substance D indicated by the circle at the concentration of "0.0." FIG. 11 is the predictive distribution in regard to the substance E. That is, FIG. 11 is the diagram showing the predictive distribution based on Bayesian inference in regard to the substance E indicated by the cross at the concentration of "0.0."

In FIGS. 7 to 11, the probabilities that each peak belongs to the substances A to E are indicated by shading. A darker color indicates a higher belonging probability. The lighter the color, the lower a belonging probability. As shown in FIG. 11, it can be seen that a peak indicated by the cross has the high probability of belonging to the substance E at any concentration. Further, as shown in FIGS. 8 and 9, it can be seen that a peak indicated by the star at a concentration equal to or higher than "0.25" has the probability of belonging to the substance C to a certain extent as well as the probability of belonging to the substance B. Further, as shown in FIGS. 8 and 9, it can be seen that a peak indicated by the triangle at a concentration equal to or higher than "0.25" has the probability of belonging to the substance B to a certain extent as well as the probability of belonging to the substance C.

Because a categorical distribution is marginalized at the time of sampling, it is actually necessary to separately calculate a categorical distribution. The score calculator 203 calculates a likelihood L(c) expressed by the following formula (2) using the sampling of a posterior distribution.

[Formula 2]

$$L(c) = \Pi_i p(i|c) N(x_{ci}|f(c), \sigma) \qquad (2)$$

Then, in the step S106, the score calculator 203 calculates score data SD representing to which one of the substances A to E each peak belongs by using the following formula (3). The score calculator 203 saves the score data SD in the storage device 106.

[Formula 3]

$$P(c_i) = L(c_i) \Big/ \sum_c L(c) \qquad (3)$$

FIGS. 12 to 15 are diagrams showing the histograms of categorical distribution probabilities in a case in which Bayesian inference is performed in regard to the substance C. The score calculator 203 calculates a likelihood L (c), described above, using the sampling of a posterior distribution and generates the histogram of a categorical distribution probability.

FIG. 12 is a diagram showing the histogram of the categorical distribution probability in regard to the substance C at the concentration of "0.25." In FIG. 12, the abscissa indicates the probability of the categorical distribution, and the ordinate indicates the histogram (cumulative value) of the categorical distribution probability. That is, it is the histogram generated when the categorical distribution probabilities are calculated in regard to a plurality of analysis condition data pieces AP, and their results are summarized. As shown in the diagram, at the probability of 1.0, the cumulative value for i=2 is the largest. Further, at the probability of 1.0, the cumulative value for i=3 is the second largest. Thus, it can be seen that, at the concentration of "0.25," the probability that the peak for i=2 belongs to the substance C is extremely high. Further, it can be seen that, at the concentration of "0.25," the peak for i=3 also has the probability of belonging to the substance C to a certain extent.

In FIG. 12, each rate shown in the upper part of the graph indicates the score data SD of the belonging probability for each peak. The score data SD is a value indicating the occupancy rate of frequency that the belonging probability is equal to or higher than 0.8. The score data SD in a case in which i=0 to 4 is shown in order from the right end. In the example of the diagram, it is shown that the score data SD of the peak for i=0 is 0, the score data SD of the peak for i=1 is 0.02, the score data SD of the peak for i=2 is 0.69, the score data SD of the peak for i=3 is 0.3 and the score data SD of the peak for i=4 is 0.

FIG. 13 is a diagram showing the histogram of the categorical distribution probability in regard to the substance C at the concentration of "0.5." As shown in the diagram, at the probability of 1.0, the cumulative value for i=2 is the largest. Further, at the probability of 1.0, the cumulative value for i=3 is the second largest. Thus, it can be seen that, also at the concentration of "0.5," the probability that the peak for i=2 belongs to the substance C is extremely high. Further, it can be seen that, also at the concentration of "0.5," the peak for i=3 has the probability of belonging to the substance C to a certain extent. Further, it can be seen that, at the concentration of "0.5," the peak for i=1 has the probability of belonging to the substance C, although only slightly.

In FIG. 13, similarly to FIG. 12, each rate shown in the upper part of the graph indicates the score data SD of the belonging probability for each peak and is a value indicating the occupancy rate of frequency that the probability is equal to or higher than 0.8. In the example of the diagram, it is shown that the score data SD of the peak for i=0 is 0.05, the score data SD of the peak for i=1 is 0.09, the score data SD of the peak for i=2 is 0.61, the score data SD of the peak for i=3 is 0.24 and the score data SD of the peak for i=4 is 0.

FIG. 14 is a diagram showing the histogram of the categorical distribution probability in regard to the substance C at the concentration of "0.75." FIG. 15 is a diagram showing the histogram of the categorical distribution probability in regard to the substance C at the concentration of "1.0." Also, at the concentrations of "1.0" and "0.75," it can be seen that the probability that the peak for i=2 belongs to the substance C is extremely high.

In the example of FIG. 14, it is shown that the score data SD of the peak for i=0 is 0.14, the score data SD of the peak for i=1 is 0.12, the score data SD of the peak for i=2 is 0.59, the score data SD of the peak for i=3 is 0.16 and the score data SD of the peak for i=4 is 0. In the example of FIG. 15, it is shown that the score data SD of the peak for i=0 is 0.14, the score data SD of the peak for i=1 is 0.19, the score data SD of the peak for i=2 is 0.51, the score data SD of the peak for i=3 is 0.15 and the score data SD of the peak for i=4 is 0. Although the occupancy rate of the frequency that the probability of the categorical distribution is equal to or higher than 0.8 is used as the score data SD in the examples shown in FIGS. 11 to 14, this is merely an example. The score data SD may be generated based on a belonging probability indicating to which substance each peak belongs. In other words, the score data SD may be correlated with a belonging probability indicating to which substance each peak belongs.

Next, in the step S107, the score displayer 206 displays the score data SD on the display 104. Subsequently, in the step S108, the distribution displayer 205 displays the distribution (predictive distribution) of the belonging probability calculated in the step S105 on the display 104. FIG. 16 is a diagram showing an analysis assistance screen displayed on the display 104. In the example shown in FIG. 16, the score data SD of the belonging probability of the substance C and the distribution of the belonging probability in regard to the substance C are displayed on the analysis assistance screen.

In FIG. 16, the "belonging score of the substance C" is displayed based on the score data SD. The belonging scores of the substance C are similar to the scores displayed in the upper parts of the histograms shown in FIGS. 12 to 15. Further, the distribution of the belonging probability in regard to the substance C is similar to the one shown in FIG. 9. Although the analysis assistance information in regard to the substance C is displayed in FIG. 16 by way of example, the same applies to the substances A, B, D, E.

In this manner, the computer 1 of the present embodiment displays the score data SD that is based on the belonging probability indicating to which substance included in a sample each peak included in each chromatogram belongs on the display 104. Thus, the user can confirm the belonging probability of a peak. Further, the computer 1 of the present embodiment displays the distribution of a belonging probability obtained by a regression analysis on the display 104. Thus, the user can visually confirm validity of belonging of a peak.

(4) CORRESPONDENCES BETWEEN CONSTITUENT ELEMENTS IN CLAIMS AND PARTS IN PREFERRED EMBODIMENTS

In the following paragraphs, non-limiting examples of correspondences between various elements recited in the claims below and those described above with respect to various preferred embodiments of the present disclosure are explained. In the above-mentioned embodiment, the liquid chromatograph 3 is an example of an analysis device. Further, in the above-mentioned embodiment, the computer 1 is an example of a peak tracking device.

As each of constituent elements recited in the claims, various other elements having configurations or functions described in the claims can be also used.

(5) OTHER EMBODIMENTS

In the above-mentioned embodiment, the computer 1 displays the score data SD calculated by the score calculator 203 on the display 104. In another embodiment, the computer 1 may output the score data SD calculated by the score calculator 203 to another device, another program, another process or the like. For example, the score data SD may be output to a device that executes a process intended for AQBD (Analytical Quality by Design). In this case, the controller 200 of the computer 1 further includes an outputter in addition to the functions in the block diagram shown in FIG. 2.

For example, there is a program or a device that acquires a design space of a retention time or a resolution by performing a regression analysis of the retention time or the resolution of a peak. The score data SD calculated in the present embodiment may be output to a program or a device that processes these design spaces. For example, in a device that has received the score data SD, information that associates the design space and the score data SD to each other can be presented.

In the above-mentioned embodiment, the liquid chromatograph 3 is used the analysis device of the present invention, by way of example. In addition, the present invention can be applied to a gas chromatograph. Further, in the above-mentioned embodiment, the computer 1 which is the peak tracking device of the present embodiment is connected to the liquid chromatograph 3 which is the analysis device through the network 4, by way of example. In another embodiment, the computer 1 may be built in the analysis device.

In the above-mentioned embodiment, the liquid chromatograph 3 may correspond to the analysis device of the present invention, by way of example. In addition, the present invention can be applied to a gas chromatograph. Further, in the above-mentioned embodiment, the computer 1 which is the peak tracking device of the present embodiment is connected to the liquid chromatograph 3 which is the analysis device through the network 4, by way of example. In another embodiment, the computer 1 may be built in the analysis device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

(6) ASPECTS

It will be appreciated by those skilled in the art that the exemplary embodiments described above are illustrative of the following aspects.

(Item 1) A peak tracking device according to one aspect of the present invention includes a chromatogram acquirer that acquires chromatograms based on measurement data pieces obtained from measurements by an analyzer in accordance with analysis condition data pieces, a score calculator that calculates score data based on a belonging probability, the probability being calculated for each peak appeared in each chromatogram to belong to one of substances included in a sample, and a score displayer that displays on a display the score data calculated by the score calculator.

It is possible to provide information useful for identifying peaks included in a chromatogram to a user.

(Item 2) The peak tracking device according to item 1, wherein the score calculator may calculate the belonging probability by performing a regression analysis of the plurality of analysis condition data pieces and a retention time of each substance obtained based on each analysis condition data piece.

It is possible to utilize a regrettable retention time to provide information useful for identifying peaks included in a chromatogram to the user.

(Item 3) The peak tracking device according to item 2, wherein the peak tracking device may further include a distribution displayer that displays a distribution of the belonging probability obtained by the regression analysis.

The user can confirm validity of identification of a peak by referring to the distribution of the belonging probability.

(Item 4) The peak tracking device according to item 2 or 3, wherein the score calculator may calculate the belonging probability based on a likelihood, which is acquired from an error distribution when an error is provided to a regression function with use of Bayesian inference, and a probability that each peak is to be selected.

It is possible to present the belonging probability indicating to which substance a peak belongs by using Bayesian inference.

(Item 5) A peak tracking device according to another aspect of the present invention includes a chromatogram acquirer that acquires chromatograms based on measurement data pieces obtained from measurements by an analyzer in accordance with analysis condition data pieces, a score calculator that calculates score data based on a belonging probability, the probability being calculated for each peak appeared in each chromatogram to belong to one of substances included in a sample, and an outputter that outputs the score data calculated by the score calculator.

Score data can be utilized in another device or another program.

(Item 6) A peak tracking method according to another aspect of the present invention includes the steps of acquiring chromatograms based on measurement data pieces obtained from measurements by an analyzer in accordance with analysis condition data pieces, calculating score data based on a belonging probability, the probability being calculated for each peak appeared in each chromatogram to belong to one of substances included in a sample, and displaying on a display the calculated score data.

(Item 7) A peak tracking program according to another aspect of the present invention causes a computer to execute processes of acquiring chromatograms based on measurement data pieces obtained from measurements by an analyzer in accordance with analysis condition data pieces, calculating score data based on a belonging probability, the probability being calculated for each peak appeared in each chromatogram to belong to one of substances included in a sample, and displaying on a display the calculated score data.

The invention claimed is:

1. A chromatogram analysis support program being executed by a processor provided in a computer to cause the computer to perform steps of:

providing first and second analysis condition data pieces having different parameters to an analyzer, and acquiring first and second chromatograms by analyzing a same sample including first and second substances from the analyzer;

identifying retention times of first and second peaks included in the first chromatogram;

identifying retention times of third and fourth peaks included in the second chromatogram;

performing, from the retention times of the first to fourth peaks and values of the parameters, a regression analysis of retention time of the first to fourth peaks to estimate retention time changes for each of the first and second substances, and calculating first and second belonging probabilities indicating to which of the first and second substances each of the first to fourth peaks belongs, wherein the first and second belonging probabilities are calculated from estimated retention times of the respective peaks obtained by the regression analysis; and displaying the first or second belonging probability on a display or outputting the first or second belonging probability.

2. The chromatogram analysis support program according to claim 1, wherein in the step of calculating the first and second belonging probabilities, the belonging probability in regard to a plurality of respective substances included in a sample is calculated.

3. The chromatogram analysis support program according to claim 1, further comprising displaying a distribution of the first and second belonging probabilities obtained by the regression analysis.

4. The chromatogram analysis support program according to claim 1, wherein the first and second belonging probabilities are calculated based on a likelihood, which is acquired from an error distribution when a regression analysis function is used for Bayesian inference, and a probability that each peak is to be selected.

5. The chromatogram analysis support program according to claim 1, wherein the step of calculating the first and second belonging probabilities comprises calculating the belonging probability in regard to a plurality of respective substances included in a sample.

* * * * *